United States Patent Office 3,135,747
Patented June 2, 1964

3,135,747
PYRIDINYL-OXADIAZINES
Donald L. Trepanier, Indianapolis, Ind., assignor to The Dow Chemical Company, Midland, Mich., a corporation of Delaware
No Drawing. Filed May 14, 1962, Ser. No. 194,694
3 Claims. (Cl. 260—244)

This invention is directed to a novel pyridinyl-1,3,4-oxadiazine and the mineral acid salts thereof.

More specifically, the compounds of the invention are 4,5 - dimethyl - 6 - phenyl - 2(4-pyridinyl)-5,6-dihydro-4H-1,3,4-oxadiazine and its mineral acid salts. Said basic oxadiazine product has the formula

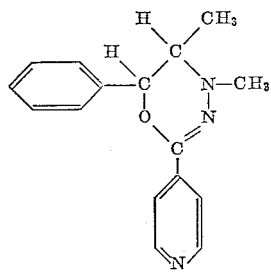

The compound, having said formula, is an oily liquid, somewhat soluble in a variety of organic solvents, for example, in polar, organic solvents such as lower alkanols, in aliphatic ethers and in halohydrocarbons such as methylene chloride and chloroform. The free basic form of the oxadiazine is only slightly soluble in water, while the mineral acid salts thereof show substantial water solubility. Said mineral acid salts, such as the hydrochloride, are crystalline solids. The new compounds have been found to be pharmacologically active in affecting the central nervous system of higher animals and in particular, in prolonging the hypnotic effects of barbiturates.

The oxadiazine compound is prepared by a simultaneous dehydration and cyclization reaction which is brought about by dissolving 1-methyl-1(1-methyl-2-hydroxy-2-phenylethyl)-2(isonicotinoyl) hydrazine, otherwise known as N-(isonicotinoylamino) ephedrine, in an excess of concentrated sulfuric acid at a temperature of from about 10° to about 45° C. Good results are obtained when from about 5 to 20 parts by weight of concentrated sulfuric acid are employed for each part by weight of the substituted hydrazine compound. Thereafter the oxadiazine is isolated by pouring the sulfuric acid solution into ice, neutralizing the resulting solution and extracting the desired oxadiazine compound into chloroform. The oxadiazine compound may then be separated by conventional procedures such as washing, drying and distillation of the solvent. When it is desired to prepare the crystalline salt forms, the oily basic oxadiazine compound is taken up in ether and treated with a dry, ethereal solution of a mineral acid to precipitate the corresponding mineral acid salt of the oxadiazine compound.

The N-(acylamino) ephedrine, employed as a raw material herein, is disclosed and claimed in my copending application, Serial No. 194,691, filed concurrently herewith.

In a representative operation, two parts by weight of 1 - methyl - 1(1 - methyl-2-hydroxy-2-phenylethyl)-2(isonicotinoyl) hydrazine was added portionwise with swirling to 20 parts by weight of concentrated sulfuric acid. Whenever slight warming occurred, the reaction vessel and contents were cooled in an ice bath. The addition of the hydrazine compound to the sulfuric acid was completed in about 30 minutes. Thereafter, the mixture was made alkaline by cautious addition of a concentrated aqueous solution of sodium bicarbonate and then extracted with chloroform. The chloroform solution was separated, washed with water and dried over anhydrous sodium sulfate. The resulting dry chloroform solution was evaporated in vacuo to leave as a residue the crude 4,5 - dimethyl - 6-phenyl-2(4-pyridyl)-5,6-dihydro-4H-1,3,4-oxadiazine as an oily liquid which did not crystallize on standing. The oily product was dissolved in ether and treated with ethereal hydrogen chloride to precipitate the hydrochloride of said oxadiazine as a crystalline product. Said hydrochloride was separated by filtration, washed with ether, air-dried and twice recrystallized from isopropyl alcohol to obtain the purified hydrochloride salt of 4,5 - dimethyl - 6-phenyl-2(4-pyridyl)-5,6-dihydro-4H-1,3,4-oxadiazine having a melting point of 240°–242° C. with decomposition, and containing proportions by weight of carbon, hydrogen and nitrogen in the molecule as determined by analysis in good agreement with the theoretical percentages of said elements calculated for the assigned structure.

To test for toxicity and to demonstrate the pharmacologic activity of the pyridinyl-oxadiazine, groups of 10 albino mice were injected intraperitoneally on four successive days with an aqueous solution of 4,5-dimethyl-6-phenyl - 2(4-pyridinyl)-5,6-dihydro-4H-1,3,4-oxadiazine hydrochloride at a dosage of 100 milligrams per kilogram per day. No gross signs of toxicity were observed in the injected mice. Two hours after the fourth dose of the oxadiazine salt, each of the treated mice was given an intraperitoneal dose of hexobarbital at the rate of 100 milligrams per kilogram. Ten exactly similar mice which had not received the oxadiazine compound were simultaneously dosed with hexobarbital at 100 milligrams per kilogram i.p. to serve as checks. Within a few minutes after injection of the hexobarbital, all the mice were asleep. Each mouse was placed on its back and the period of time from injection of the hexobarbital until the mouse purposely righted itself was recorded as the sleep time. The average sleep time for the mice pretreated with the pyridinyl-oxadiazine salt was 11.3 times as long as the average sleep time for the checks. When mice were dosed in exactly similar fashion except that a dosage rate of only 50 milligrams per kilogram of the oxadiazine compound was employed, the average hexobarbital sleep time for the treated mice was 9 times that of the checks.

I claim:
1. A compound selected from the group consisting of 4,5 - dimethyl - 6-phenyl-2(4-pyridinyl)-5,6-dihydro-4H-1,3,4-oxadiazine and its hydrochloride salt.
2. 4,5 - dimethyl - 6-phenyl-2(4-pyridinyl)-5,6-dihydro-4H-1,3,4-oxadiazine.
3. 4,5 - dimethyl - 6-phenyl-2(4-pyridinyl)-5,6-dihydro-4H-1,3,4-oxadiazine hydrochloride.

No references cited.